US007502779B2

(12) United States Patent
Brockway et al.

(10) Patent No.: US 7,502,779 B2
(45) Date of Patent: Mar. 10, 2009

(54) SEMANTICS-BASED SEARCHING FOR INFORMATION IN A DISTRIBUTED DATA PROCESSING SYSTEM

(75) Inventors: Brandon Brockway, Austin, TX (US); Tiffany Brooke Durham, Austin, TX (US); Cheryl Louise Malatras, Austin, TX (US); Gregory Wayne Roberts, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 10/455,173

(22) Filed: Jun. 5, 2003

(65) Prior Publication Data

US 2004/0249795 A1 Dec. 9, 2004

(51) Int. Cl.
*G06F 7/00* (2006.01)
*G06F 17/30* (2006.01)

(52) U.S. Cl. .................................. 707/3; 707/10; 704/9
(58) Field of Classification Search .................... 707/3, 707/10; 704/9
See application file for complete search history.

(56) References Cited

U.S. PATENT DOCUMENTS

| | | | | |
|---|---|---|---|---|
| 6,175,828 B1 * | 1/2001 | Kuromusha et al. | ........... | 707/3 |
| 6,175,829 B1 * | 1/2001 | Li et al. | ........... | 707/3 |
| 6,510,406 B1 * | 1/2003 | Marchisio | ........... | 704/9 |
| 2002/0073075 A1 | 6/2002 | Dutta | ........... | 707/3 |
| 2003/0046275 A1 | 3/2003 | Osias | ........... | 707/3 |

OTHER PUBLICATIONS

Developing Distributed Applications by Semantics-Based Automatic Replication http://ieeexplore.ieee.org/iel2/3234/9760/00465275.pdf.*
"Developing Distributed Applications by Semantics-Based Automatic Replication", by: Sumin Huang, Published 1994 http://ieeexplore.ieee.org/iel2/3234/9760/00465275.pdf?tp=&isnumber=&arnumber=465275.*
Rahardijo, Budi et al.; 'Automatic Information Extraction from Web Pages'; Sep. 2001; SIGR Forum, School of Computing National University of Singapore; pp. 430-431.
Dori, Dov et al.; 'The Representation of Document Structure: A Generic Object-Process Analysis'; Handbook on Optical Recognition and Document Image Analysis; 1996; Chapter 17 1-36.
http://www.apple.com/find/searchtips./html.

* cited by examiner

*Primary Examiner*—Apu Mofiz
*Assistant Examiner*—Chelcie Daye
(74) *Attorney, Agent, or Firm*—John Biggers; Herman Rodriguez; Biggers & Ohanian LLP.

(57) ABSTRACT

Searching for information in a distributed data processing system, including providing a semantics-based search index by storing in the semantics-bases search index search keywords from documents according to semantics from selected document structure templates, the document structure templates selected in dependence upon the structures of the documents and upon model document structures in the document structure templates; establishing a search scope corresponding to semantics supported by the semantics-based search index; receiving from a client a search query message comprising search terms and, optionally, the search scope; retrieving, from the semantics-based search index, index entries satisfying the search terms and the search scope; creating from the retrieved index entries a search result message; and transmitting the search result message to the client.

30 Claims, 12 Drawing Sheets

| Document Structure Templates ||
|---|---|
| Model Document Structures | Semantics |
| 402 — • HTML<br>    ○ HEAD<br>    ○ BODY<br>        ■ FRAMESET<br>            • FRAME — 416<br>            • FRAME — 418 | Header<br><br>Footer |
| 404 — • HTML<br>    ○ HEAD<br>    ○ BODY<br>        ■ TABLE<br>            • TR<br>                ○ TD<br>            • TR<br>                ○ TD — 420<br>                ○ TD — 422<br>            • TR<br>                ○ TD | Header<br><br>Navigation<br>Content<br><br>Footer |
| 406 — • HTML<br>    ○ HEAD<br>    ○ BODY<br>        ■ TABLE — 424 | Header |
| 408 — • HTML<br>    ○ HEAD<br>    ○ BODY | Document |
| 410 — • HTML<br>    ○ HEAD | Document |
| ↑ 412 | ↑ 414 |

FIG. 4

Semantics-Based Search Index — 500

| | Keyword | Semantics | PartID | Relevance | URL |
|---|---|---|---|---|---|
| 552 | IBM | Title | 1 | 1 | www.ibm.com |
| 554 | IBM | Header | 2 | 3 | www.ibm.com |
| 556 | IBM | Content | 3 | 4 | www.ibm.com |
| 558 | IBM | Content | 4 | 2 | www.ibm.com |
| 560 | Web | Content | 3 | 2 | www.ibm.com |
| 562 | Portal | Content | 3 | 2 | www.ibm.com |
| 564 | Java | Navigation | 7 | 1 | www.ibm.com |
| 566 | Java | Header | 8 | 1 | www.ibm.com |
| 568 | Java | Content | 4 | 2 | www.ibm.com |

Semantics-Based Search Index (900)

| | Keyword | Semantics | PartID | Relevance | URL |
|---|---|---|---|---|---|
| 902 | mine | Header | 1 | 6 | www.geology.com |
| 904 | mine | Content | 2 | 5 | www.geology.com |
| 906 | marine | Navigation | 3 | 4 | www.geology.com |
| 908 | geology | Advertisement | 4 | 3 | www.geology.com |
| 910 | geology | Content | 2 | 2 | www.geology.com |
| 912 | geology | Content | 5 | 1 | www.geology.com |
| 914 | mine | Header | 1 | 6 | www.uchicago.edu |
| 916 | mine | Content | 6 | 5 | www.uchicago.edu |
| 918 | coastal | Navigation | 3 | 4 | www.uchicago.edu |
| 920 | geology | Advertisement | 4 | 3 | www.uchicago.edu |
| 922 | geology | Content | 2 | 2 | www.uchicago.edu |
| 924 | geology | Content | 6 | 1 | www.uchicago.edu |
| 926 | mine | Header | 1 | 6 | www.coastal.gov |
| 928 | mine | Content | 8 | 5 | www.coastal.gov |
| 930 | geophysics | Navigation | 3 | 4 | www.coastal.gov |
| 932 | geology | Advertisement | 4 | 2 | www.coastal.gov |
| 934 | geology | Content | 8 | 3 | www.coastal.gov |
| 936 | geology | Content | 5 | 1 | www.coastal.gov |

| | Keyword | Semantics | PartID | Relevance | URL |
|---|---|---|---|---|---|
| 902 | mine | Header | 1 | 6 | www.geology.com |
| 904 | mine | Content | 2 | 5 | www.geology.com |
| 906 | | | | | |
| 908 | geology | Advertisement | 4 | 3 | www.geology.com |
| 910 | geology | Content | 2 | 2 | www.geology.com |
| 912 | geology | Content | 5 | 1 | www.geology.com |
| 914 | mine | Header | 1 | 6 | www.uchicago.edu |
| 916 | mine | Content | 6 | 5 | www.uchicago.edu |
| 918 | | | | | |
| 920 | geology | Advertisement | 4 | 3 | www.uchicago.edu |
| 922 | geology | Content | 2 | 2 | www.uchicago.edu |
| 924 | geology | Content | 6 | 1 | www.uchicago.edu |
| 926 | mine | Header | 1 | 6 | www.coastal.gov |
| 928 | mine | Content | 8 | 5 | www.coastal.gov |
| 930 | | | | | |
| 932 | geology | Advertisement | 4 | 2 | www.coastal.gov |
| 934 | geology | Content | 8 | 3 | www.coastal.gov |
| 936 | geology | Content | 5 | 1 | www.coastal.gov |

| | Keyword | Semantics | PartID | Relevance | URL |
|---|---|---|---|---|---|
| | | | | | |
| 902 | | | | | |
| 904 | mine | Content | 2 | 5 | www.geology.com |
| 906 | | | | | |
| 908 | | | | | |
| 910 | geology | Content | 2 | 2 | www.geology.com |
| 912 | | | | | |
| 914 | | | | | |
| 916 | mine | Content | 6 | 5 | www.uchicago.edu |
| 918 | | | | | |
| 920 | | | | | |
| 922 | | | | | |
| 924 | geology | Content | 6 | 1 | www.uchicago.edu |
| 926 | | | | | |
| 928 | mine | Content | 8 | 5 | www.coastal.gov |
| 930 | | | | | |
| 932 | | | | | |
| 934 | geology | Content | 8 | 3 | www.coastal.gov |
| 936 | | | | | |

| Search Result Message Entries | | | |
|---|---|---|---|
| Title | Description | URL | Relevance |
|  |  |  |  |
| --- | --- | www.coastal.gov | 8 |
| --- | --- | www.geology.com | 7 |
| --- | --- | www.uchicago.edu | 6 |

SEMANTICS-BASED SEARCHING FOR INFORMATION IN A DISTRIBUTED DATA PROCESSING SYSTEM

BACKGROUND OF THE INVENTION

1. Field of the Invention

The field of the invention is data processing, or, more specifically, methods, systems, and products for indexing information in a distributed data processing system.

2. Description of Related Art

An example from current art of a large distributed data processing system is the World Wide Web. Search engines on the web are basically massive full-text indexes of millions of web pages. These search engines are specialized software programs specialized to receive search query messages from users or from users' browsers, where the search query messages comprise keywords or search terms. Search engines formulate, or 'parse,' the query messages into database queries against web search databases comprising massive search indexes.

The web includes many web sites comprising many millions of web pages, each of which is a document specially structured in a markup language, such as, for example, HTML, WML, HDML, and so on, to support some hyperlinking in some data communications protocol, such as, for example, HTTP, WAP, HDTP, and so on. The search indexes for the search engines are created by software robots called 'spiders' or 'crawlers' that survey the web and retrieve documents for indexing. The indexing itself is often carried out by another software engine that takes as its input the pages gathered by spiders, extracts keywords according to some algorithm, and creates index entries based upon the keywords and URLs identifying the indexed documents.

That is, spiders gather documents into a documents database, identifying the documents to be gathered from a URL list in the documents database or through hyperlinks in the documents themselves or through other methods. Spiders take as their inputs the entire web and produce as outputs documents to be indexed. Indexing engines take as their inputs documents to be indexed and produce as their outputs search indexes. Search engines take as inputs search indexes and search request messages bearing search terms and produce as their outputs search result messages for return to requesting users' browsers.

In current art, search engines return search results matching search terms from search requests with no indication where on a page the search terms were located. A search for the terms "ejb+xml+bmp" therefore can and often does return results in which those terms appear in an advertisement or a navigation panel in a document whose actual content has nothing to do with the search terms. This is true, despite the fact that the specially structured documents comprising the web all contain indications of the structure of the documents themselves, because the documents do not indicate the meaning of their structure. That is, the fact that search terms appear in an HTML table, form, or frame does not indicate whether the table, form, or frame is an advertisement, a navigation panel, or actual content. With no specification of the meaning, the semantics, of the structure, indexing engines are unable to include the semantics in the search indexes, and search engines are therefore unable to distinguish semantics or support search queries on the basis of semantics. There are ongoing needs for improvement, therefore, in searching and indexing documents in large distributed data processing system like the web.

SUMMARY OF THE INVENTION

Methods, systems, and computer program products are disclosed for searching for information in a distributed data processing system, typically comprising providing a semantics-based search index by storing in the semantics-bases search index search keywords from documents according to semantics from selected document structure templates, the document structure templates selected in dependence upon the structures of the documents and upon model document structures in the document structure templates; establishing a search scope corresponding to semantics supported by the semantics-based search index; receiving from a client a search query message comprising search terms and, optionally, the search scope; retrieving, from the semantics-based search index, index entries satisfying the search terms and the search scope; creating from the retrieved index entries a search result message; and transmitting the search result message to the client.

In typical embodiments of the present invention, establishing a search scope comprises setting a search scope in the client, and the search query message further comprises the search scope. In some embodiments, establishing a search scope comprises setting a search scope in a server.

In typical embodiments, retrieving, from the semantics-based search index, index entries satisfying the search terms and the search scope comprises parsing, in dependence upon the correspondence between the search scope and the semantics, the search terms and search scope into a search query. In typical embodiments, retrieving, from the semantics-based search index, index entries satisfying the search terms and the search scope comprises asserting a search query against the semantics-based search index. In typical embodiments, creating the search result message comprises generating, in dependence upon assigned indications of relevance for the index entries, measures of relevance for entries in the search result message. In typical embodiments, creating the search result message comprises sorting search result message entries according to measures of relevance for entries in the search result message.

In typical embodiments, the distributed data processing system comprises a multiplicity of computers coupled for data communications, wherein the computers coupled for data communications further comprise clients and servers. In typical embodiments, the distributed data processing system comprises a multiplicity of computers, including clients and servers, coupled for data communications through hyperlinking protocols. In typical embodiments, the distributed data processing system comprises a multiplicity of computers, including clients and servers, coupled for data communications through hyperlinking protocols, and receiving a search query message comprises receiving, in a server comprising a search engine and supporting a hyperlinking protocol, from a client, a search query message in the supported hyperlinking protocol.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 sets forth a table of exemplary document structure templates.

FIG. 5 shows an exemplary semantics-based search index.

FIG. 9 shows an exemplary semantics-based search index.

FIG. 10 illustrates a selected subset of the records in FIG. 9.

FIG. 11 illustrates a selected subset of the records in FIG. 10.

FIG. 12 illustrates a selected subset of the records in FIG. 11.

DETAILED DESCRIPTION OF EXEMPLARY EMBODIMENTS

Introduction

Figure 1:
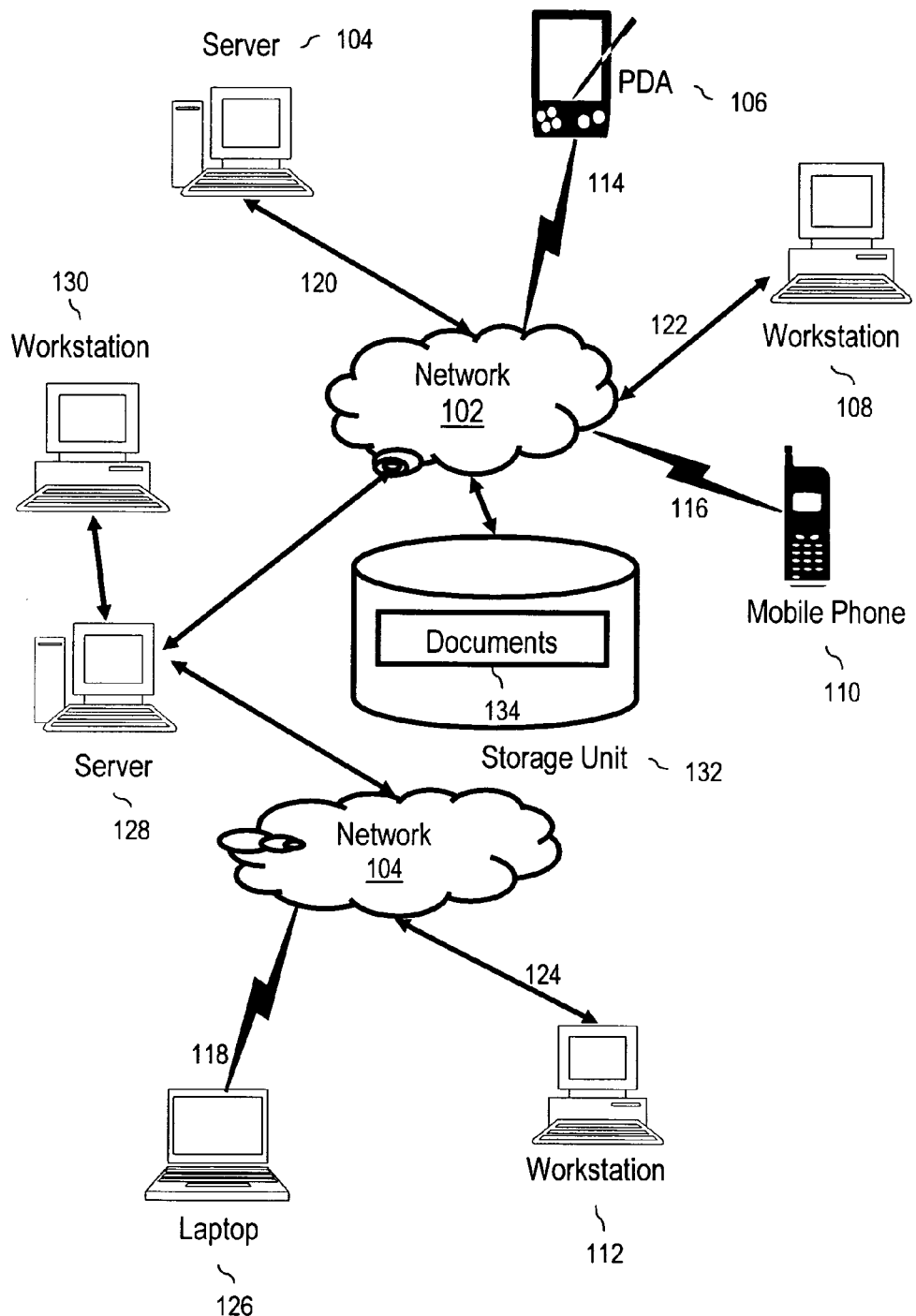
FIG. 1 depicts an architecture for a distributed data processing system in which various embodiments of the present invention may be implemented.

The present invention is described to a large extent in this specification in terms of methods for indexing information in a distributed data processing system. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DEFINITIONS

In this specification, the terms "field," "data element," and "attribute," unless the context indicates otherwise, generally are used as synonyms, referring to individual elements of information, typically represented as digital data. Aggregates of data elements are referred to as "records" or "data structures." Aggregates of records are referred to as "tables" or "files." Aggregates of files or tables are referred to as "databases." hi the context of tables, fields may be referred to as "columns," and records may be referred to as "rows." Complex data structures that include member methods, functions, or software routines as well as data elements are referred to as "classes." Instances of classes are referred to as "objects" or "class objects."

"802.11" refers to a family of specifications developed by the IEEE for wireless LAN technology. 802.11 specifies an over-the-air interface between a wireless client and a base station or between two wireless clients. Specification 802.11b, also known as '802.11 High Rate' or 'Wi Fi,' provides wireless network functionality similar to Ethernet.

"Browser" means a web browser, a communications application for locating and displaying web pages. Browsers typically comprise a markup language interpreter, web page display routines, and an HTTP communications client. Typical browsers today can display text, graphics, audio and video. Browsers are operative in network-enabled devices, including wireless network-enabled devices such as network-enabled PDAs and mobile telephones. Browsers in wireless network-enabled devices often are downsized browsers called "microbrowsers." Microbrowsers in wireless network-enabled devices often support markup languages other than HTML, including for example, WML, the Wireless Markup Language.

"CGI" means "Common Gateway Interface," a standard technology for data communications of resources between web servers and web clients. More specifically, CGI provides a standard interface between servers and server-side 'gateway' programs which administer actual reads and writes of data to and from files systems and databases.

"Client," "client device," or "client computer" refers to any computer, any automated computing machinery, used according to embodiments of the present invention to prepare and communicate search queries or search query messages for documents and, in return, receive and display search result messages and search results. Examples of client devices are personal computers, PDAs, mobile telephones, laptop computers, and others that will occur to those of skill in the art. Various embodiments of client devices support wireline communications or wireless communications. The use as a client device of any instrument capable of administering search queries and search results is well within the present invention.

A "communications application" is any data communications software capable of operating couplings for data communications to send and receive search query messages and search responses, including browsers, microbrowsers, special purpose data communications systems, and others as will occur to those of skill in the art.

"Coupled for data communications" means any form of data communications, wireless, 802.11b, Bluetooth, infrared, radio, internet protocols such as TCP/IP, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

"CPU" means 'central processing unit.' The term 'CPU' as it is used in this disclosure includes any form of computer processing unit, regardless whether single, multiple, central, peripheral, or remote, in any form of automated computing machinery, including client devices, servers, and so on.

A "document" is any resource on any distributed data process system containing information amenable to indexing and searching according to embodiments of the present invention. Documents include static files in markup languages, such as static HTML files, as well as dynamically-generated content such as query results and output from CGI scripts and Java servlets, and output from dynamic server pages such as Active Server Pages, Java Server Pages, and others as will occur to those of skill in the art.

"GUI" means 'graphical user interface.'

"HDML" stands for 'Handheld Device Markup Language,' a markup language used to format content for web-enabled mobile phones. HDML is proprietary to Openwave Systems, Inc., and can only be operated on phones that use Openwave browsers. Rather than WAP, HDML operates over Openwave's Handheld Device Transport Protocol ("HDTP").

"HTML" stands for 'HyperText Markup Language,' a standard markup language for displaying web pages on browsers.

"HTTP" stands for 'HyperText Transport Protocol,' the standard data communications protocol of the World Wide Web.

A "hyperlink," also referred to as "link" or "web link," is a reference to a resource name or network address which when invoked allows the named resource or network address to be accessed. More particularly in terms of the present invention, invoking a hyperlink implements a request for access to a resource, generally a document. Often a hyperlink identifies a network address at which is stored a resource such as a web page or other document. Hyperlinks are often implemented as anchor elements in markup in documents. As the term is used in this specification, however, hyperlinks include links effected through anchors as well as URIs invoked through 'back' buttons on browsers, which do not involve anchors. Hyperlinks include URIs typed into address fields on browsers and invoked by a 'Go' button, also not involving anchors. In addition, although there is a natural tendency to think of hyperlinks as retrieving web pages, their use is broader than that. In fact, hyperlinks access "resources" generally available through hyperlinks including not only web pages but many other kinds of data as well as dynamically-generated server-side output from Java servlets, CGI scripts, and other resources as will occur to those of skill in the art.

"The Internet" is a global network connecting millions of computers utilizing the Internet Protocol' or 'IP' as the network layer of their networking protocol stacks, and, typically, also using the Transmission Control Protocol or 'TCP' as the transport layer of their networking protocol stacks. The Internet is decentralized by design, a strong example of a distributed data processing system. An "internet" (uncapitalized) is any network using IP as the network layer in its network protocol stack.

"LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network ("WAN"). The Internet is an example of a WAN.

"Network" is used in this specification to mean any networked coupling for data communications among computers or computer systems. Examples of networks useful with the invention include intranets, extranets, internets, local area networks, wide area networks, and other network arrangements as will occur to those of skill in the art.

"PDA" refers to a personal digital assistant, a handheld computer useful as a client according to embodiments of the present invention.

"Resource" means any aggregation of information administered in distributed processing systems according to embodiments of the present invention. Network communications protocols generally, for example, HTTP, transmit resources, not just files. A resource is an aggregation of information capable of being identified by a URI or URL. In fact, the 'R' in 'URI' stands for 'Resource.' The most common kind of resource is a file, but resources include dynamically-generated query results, the output of CGI scripts, dynamic server pages, and so on. It may sometimes be useful to think of a resource as similar to a file, but more general in nature. Files as resources include web pages, graphic image files, video clip files, audio clip files, files of data having any MIME type, and so on. As a practical matter, most HTTP resources, WAP resources, and the like are currently either files or server-side script output. Server side script output includes output from CGI programs, Java servlets, Active Server Pages, Java Server Pages, and so on.

"Server" in this specification refers to a computer or device comprising automated computing machinery on a network that manages resources, including documents, and requests for access to such resources. A "web server," in particular is a server that communicates with client computers through communications applications, such as browsers or microbrowsers, by means of hyperlinking protocols such as HTTP, WAP, or HDTP, in order to manage and make available to networked computers documents, digital objects, and other resources.

"SQL" stands for 'Structured Query Language,' a standardized query language for requesting information from a database. Although there is an ANSI standard for SQL, as a practical matter, most versions of SQL tend to include many extensions. This specification provides examples of database queries against semantics-based search indexes expressed as pseudocode SQL. Such examples are said to be 'pseudocode' because they are not cast in any particular version of SQL and also because they are presented for purposes of explanation rather than as actual working models.

A "Java Servlet" is a program designed to be run from another program rather than directly from an operating system. "Servlets" in particular are designed to be run on servers from a conventional Java interface for servlets. Servlets are modules that extend request/response oriented servers, such as Java-enabled web servers. Java servlets are an alternative to CGI programs.

"TCP/IP" refers to two layers of a standard OSI data communications protocol stack. The network layer is implemented with the Internet Protocol, hence the initials 'IP.' And the transport layer is implemented with the Transport Control Protocol, referred to as 'TCP.' The two protocols are used together so frequently that they are often referred to as the TCP/IP suite, or, more simply, just 'TCP/IP.' TCP/IP is the standard data transport suite for the well-known world-wide network of computers called 'the Internet.'

A "URI" or "Universal Resource Identifier" is an identifier of a named object in any namespace accessible through a network. URIs are functional for any access scheme, including for example, the File Transfer Protocol or "FTP," Gopher, and the web. A URI as used in typical embodiments of the present invention usually includes an internet protocol address, or a domain name that resolves to an internet protocol address, identifying a location where a resource, particularly a document, a web page, a CGI script, or a servlet, is located on a network, often the Internet. URIs directed to particular resources, such as particular documents, HTML files, CGI scripts, or servlets, typically include a path name or file name locating and identifying a particular resource in a file system coupled through a server to a network. To the extent that a particular resource, such as a CGI file, a servlet, or a dynamic web page, is executable, for example to store or retrieve data, a URI often includes query parameters, or data to be stored, in the form of data encoded into the URI. Such parameters or data to be stored are referred to as 'URI encoded data,' or sometime as 'form data.'

"URI encoded data" or "form data" is data packaged in a URI for data communications, a useful method for communicating variable names and values in a distributed data processing system such as the Internet. Form data is typically communicated in hyperlinking protocols, such as, for example, HTTP which uses GET and POST functions to transmit URI encoded data. In this context, it is useful to remember that URIs do more than merely request file transfers. URIs identify resources on servers. Such resource may be files having filenames, but the resources identified by URIs also may include, for example, queries to databases, including queries to search engines according to embodiments of the present invention. Results of such queries do not necessarily reside in files, but they are nevertheless data resources identified by URIs and identified by a search engine and query data that produce such resources. An example of URI encoded data is:

http://www.foo.com/cgi-bin/
 MyScript.cgi?field1=value1&field2=value2

This example shows a URI bearing encoded data. The encoded data is the string "field1=value1&field2=value2." The encoding method is to string field names and field values separated by '&' and "=" with spaces represented by '+.' There are no quote marks or spaces in the string. Having no quote marks, spaces are encoded with '+,' and '&' is encoded with an escape character, in this example, '%26.' For example, if an HTML form has a field called "name" set to "Lucy", and a field called "neighbors" set to "Fred & Ethel", the data string encoding the form would be:

name=Lucy&neighbors=Fred+%26+Ethel

"URLs" or "Universal Resource Locators" comprise a kind of subset of URIs, such that each URL resolves to a network address. That is, URIs and URLs are distinguished in that URIs identify named objects in namespaces, where the names may or may not resolve to addresses, while URLs do resolve to addresses. Although standards today are written on the basis of URIs, it is still common to such see web-related identifiers, of the kind used to associate web data locations with network addresses for data communications, referred to as "URLs." This specification uses the terms URI and URL more or less as synonyms.

"WAN" means 'wide area network.' One example of a WAN is the Internet.

"WAP" refers to the Wireless Application Protocol, a protocol for use with handheld wireless devices. Examples of wireless devices useful with WAP include mobile phones, pagers, two-way radios, hand-held computers, and PDAs. WAP supports many wireless networks, and WAP is supported by many operating systems. WAP supports HTML, XML, and particularly WML (the Wireless Markup Language), which is a language particularly designed for small screen and one-hand navigation without a keyboard or mouse. Operating systems specifically engineered for handheld devices include PalmOS, EPOC, Windows CE, FLEXOS, OS/9, and JavaOS. WAP devices that use displays and access the Internet run "microbrowsers." The microbrowsers use small file sizes that can accommodate the low memory constraints of handheld devices and the low-bandwidth constraints of wireless networks.

"WML" stands for 'Wireless Markup Language,' an XML language used as a markup language for web content intended for wireless web-enabled devices that implement WAP. There is a WAP forum that provides a DTD for WML. A DTD is an XML 'Document Type Definition.'

"World Wide Web," or more simply "the web," refers to a system of internet protocol ("IP") servers that support specially formatted, hyperlinking documents, documents formatted in markup languages such as HTML, XML, WML, and HDML. The term "web" is used in this specification also to refer to any server or connected group or interconnected groups of servers that implement a hyperlinking protocol, such as HTTP, WAP, HDTP, or others, in support of URIs and documents in markup languages, regardless whether such servers or groups of servers are coupled to the World Wide Web as such.

"XML" stands for 'eXtensible Markup Language,' a language that support user-defined markup including user-defined elements, tags, and attributes. XML's extensibility contrasts with most web-related markup languages, such as HTML, which are not extensible, but which instead use a standard defined set of elements, tags, and attributes. XML's extensibility makes it a good foundation for defining other languages. WML, the Wireless Markup Language, for example, is a markup language based on XML. Modern browsers and other communications clients tend to support markup languages other than HTML, including, for example, XML.

Semantics-Based Indexing in Distributed Data Processing

Exemplary methods, system, and products for indexing information in a distributed data processing system are now explained with reference to the accompanying drawings, beginning with FIG. 1. FIG. 1 depicts an architecture for a distributed data processing system in which various embodiments of the present invention may be implemented. The distributed data processing system of FIG. 1 includes a number of computers coupled for data communications in networks. The distributed data processing system of FIG. 1 includes networks 102, 104. Networks in such systems may comprise LANs, WANs, intranets, internets, the Internet, webs, and the World Wide Web itself. Such networks comprise media that may be used to provide couplings for data communications between various devices and computers connected together within a distributed data processing system. Such networks may include permanent couplings, such as wire or fiber optic cables, or temporary couplings made through telephone or wireless communications.

In the example of FIG. 1, server 128 and server 104 are connected to network 102 along with storage unit 132. In addition, several exemplary client devices are also shown coupled to network 102, including a PDA 106, a workstation 108, and a mobile phone 110 also are coupled for data communications to network 102. Network-enabled mobile phone 110 connects to network 102 through wireless link 116, and PDA 106 connects to network 102 through wireless link 114.

In the example of FIG. 1, server 128 directly a direct coupling to client workstation 130 and network 104 (which may be a LAN), which incorporates wireless communication links supporting a wireless coupling 118 to laptop computer 126 and wireline protocols supporting a wired coupling to client workstation 112.

Client devices and servers in such distributed processing systems may be represented by a variety of computing devices, such as mainframes, personal computers, personal digital assistants, web-enabled mobile telephones, and so on. The particular servers and client devices illustrated in FIG. 1 are for explanation, not for limitation. Distributed data processing systems may include additional servers, clients, routers, other devices, and peer-to-peer architectures, not shown in FIG. 1, as will occur to those of skill in the art. Networks in such distributed data processing systems may support many data communications protocols, TCP/IP, HTTP, WAP, HDTP, and others as will occur to those of skill in the art. Various embodiments of the present invention may be implemented on a variety of hardware platforms in addition to those illustrated in FIG. 1. FIG. 1 is intended as an example of a heterogeneous distributed computing environment in which various embodiments of the present invention may be implemented, not as an architectural limitation of the present invention.

Figure 2:
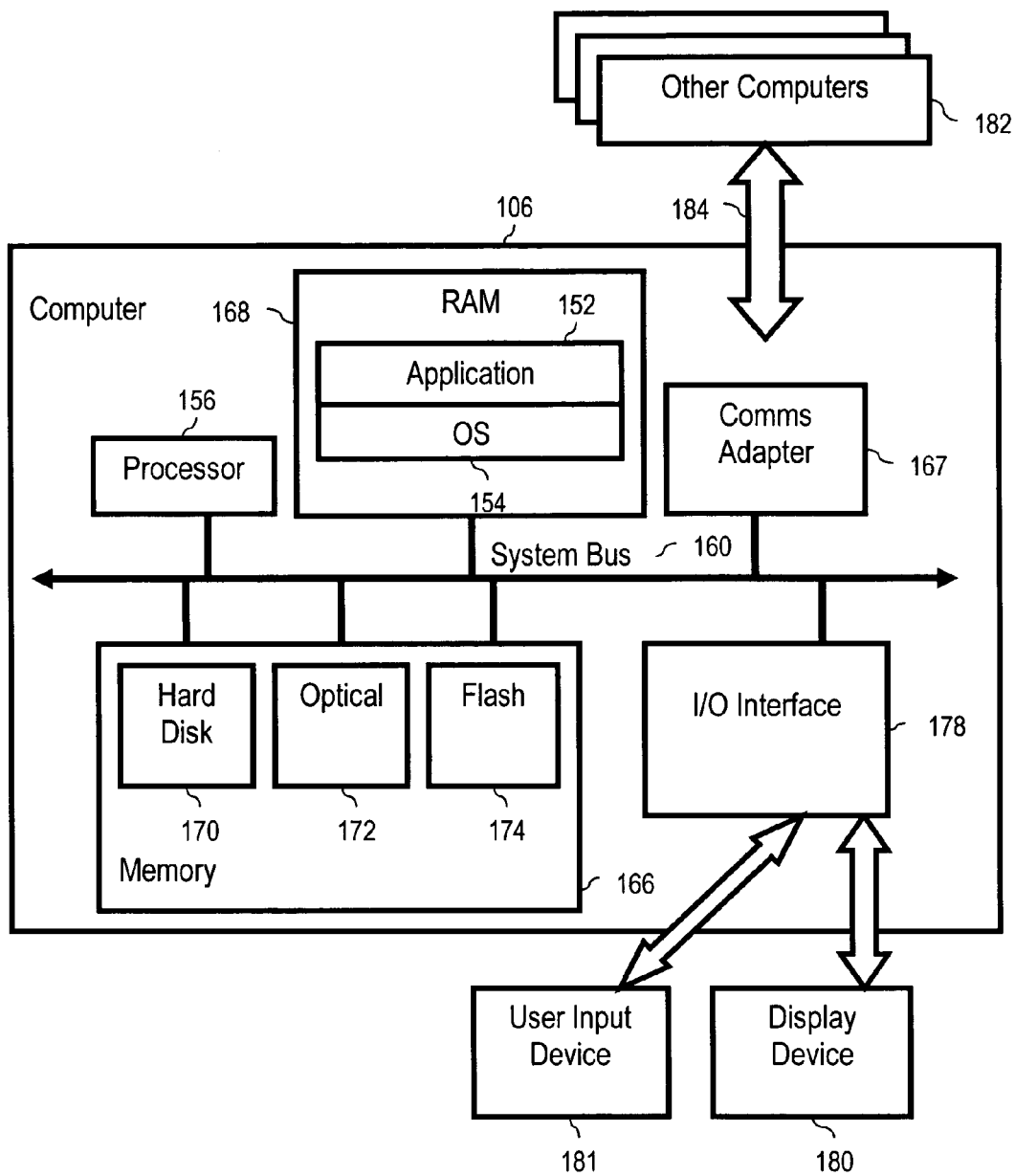
FIG. 2 sets forth a block diagram of computer useful in systems for indexing information in distributed data processing systems according to embodiments of the present invention.

FIG. 2 sets forth a block diagram of automated computing machinery comprising a computer 106 such as a client device or server useful in systems for indexing information in distributed data processing systems according to embodiments of the present invention. The computer 106 of FIG. 2 includes at least one computer processor 156 or 'CPU' as well as random access memory 168 ("RAM"). Stored in RAM 168 is an application program 152 implementing inventive methods of the present invention. Also stored in RAM 168 is an operating system 154. Operating system useful in computer according to embodiments of the present invention include Unix, Linux, and Microsoft NT™.

The computer 106 of FIG. 2 includes computer memory 166 coupled through a system bus 160 to the processor 156 and to other components of the computer. Computer memory 166 may be implemented as a hard disk drive 170, optical disk drive 172, electrically erasable programmable read-only memory space (so-called 'EEPROM' or 'Flash' memory) 174, RAM drives (not shown), or as any other kind of computer memory as will occur to those of skill in the art.

The example computer 106 of FIG. 2 includes communications adapter 167 implementing couplings for data communications 184 to other computers 182, servers or clients. Communications adapters implement the hardware level of couplings for data communications through which client computers and servers send data communications directly to one another and through networks. Examples of communications adapters include modems for wired dial-up connections, Ethernet (IEEE 802.3) adapters for wired LAN connections, and 802.11b adapters for wireless LAN connections.

The example computer of FIG. 2 includes one or more input/output interface adapters 178. Input/output interface adapters in computers implement user-oriented input/output through, for example, software drivers and computer hardware for controlling output to display devices 180 such as computer display screens, as well as user input from user input devices 181 such as keyboards and mice.

Figure 3:
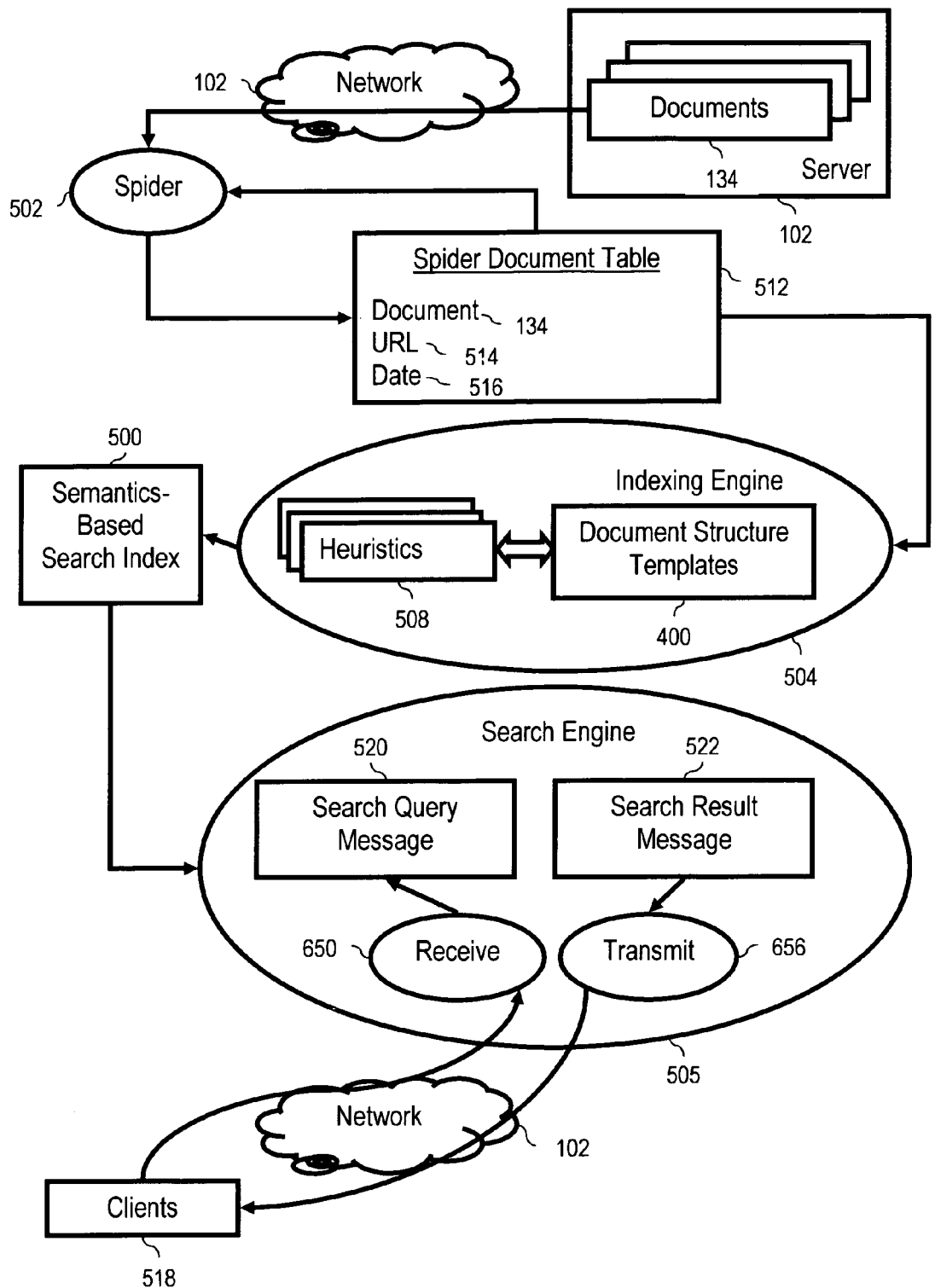
FIG. 3 depicts an exemplary software architecture in which methods, systems, and products may be implemented according to embodiments of the present invention.

As an aid to further explanation, FIG. 3 depicts an exemplary software architecture in which methods and systems may be implemented according to embodiments of the present invention. The example of FIG. 3 includes a spider document database 512, so-called to denote that it is the result of the operations of a spider 502 in retrieving documents 134 from servers 102 in a distributed data processing system. In the example of FIG. 3, only one server 102 is shown, but readers will understand that the spider 302 in fact retrieves documents from many servers as discussed above in connection with the description of the distributed data processing system of FIG. 1.

The document table 512 is depicted for purposes of explanation as a table having three fields or columns, one for the retrieved documents themselves 134, one for a URL identifying the network locations from which the documents are retrieved, and a third recording the date when each document was retrieved 516. The spider updates the document table periodically by revisiting network sites that have already been 'spidered.' The last-spidered dates 516 in the document table 512 advise the spider when to revisit network locations or web sites to update documents from each location or site.

Use of a document table 512 is particularly advantageous in view of the dynamic nature of many of the documents gathered by spiders for indexing. As mentioned above, many documents are dynamically generated output of CGI scripts, Java servlets, and dynamic server pages. Such dynamically-generated documents do not exist in static form, and they may never be generated again in the same form acquired by any particular spider access. Web pages from news organizations and pages from popular web sites bearing many advertisements, to mention just two examples, are extremely dynamic. It is useful, therefore, for a spider 502 to capture such documents periodically in static form and place them in interim storage, such as the spider document table 512, until an indexing engine 504 has time to index their contents.

In this example, documents 134 are stored in the exemplary document table 512 of FIG. 3, so that words within them can be indexed as keywords by an indexing engine 504. The index engine 504 also stores a URL 514 with each index entry, so that it will be available for a search engine 505 to include in search result messages 522. The term 'search engine' is sometimes used to refer to search engines, spiders, and indexing engines. Sometimes the word 'spider' is used to refer to both the function of gathering documents for indexing and the indexing process. In this discussion, for clarity of explanation, the three functions are referenced separately.

The indexing engine 504 in this example operates asynchronously with respect to the spider 502. The time between the spider's gathering documents from a particular network location or web site and the appearance of new search index entries for that site may minutes, hours, days, or even weeks, depending on the size of the document table 512, the speed of the spider 502, the speed of the indexing engine 504, and, if the indexing engine is not operated continuously, how often the indexing engine is run.

The indexing engine 504 in this example uses document structure templates 400 to identify semantics for the structure of the documents 134. FIG. 4 sets forth a table of exemplary document structure templates. The document structure templates of FIG. 4 include a field or column for model document structure 412 and a field or column for the semantics 414 of the structures. In the illustrated example, the indexing engine identifies semantics for a document by selecting a document structure template from a table similar to the one in FIG. 4. That is, the indexing engine selects a document structure template by identifying the structure of a document, comparing the structure of the document and the model document structures in the templates, and selecting a template whose model document structure matches the structure of the document.

The example indexing engine of FIG. 3 identifies identifying the structure of a document by parsing the contents of the document into a document data structure representing the structure of the document. Documents such as HTML documents, XML documents, WML documents, and the like, typically are advantageously represented in tree structures because of the hierarchical nature of the languages in which such documents are represented. Indexing engines according to embodiments of the present invention, therefore, often identify the structure of a document by parsing the contents of the document into a tree structure representing the structure of the document. For convenience of explanation, the model document structures 412 in the table of document structure templates of FIG. 4 depict HTML document structures parsed into trees, although other document structures and other data structures for representing and identifying document structure may be used, as will occur to those of skill in the art.

The indexing engine 504 in the example of FIG. 3 uses heuristics 508 to identify semantics for the structure of the documents 134. Heuristics are rules for semantics identification expressed as algorithms. For purposes of explanation, the heuristics 508 and the document structure templates 400 are shown separately. As a practical matter, however, in many systems according to embodiments of the present invention, heuristic algorithms for identifying semantics for document structure and a pertinent document structure template are encapsulated together in an object-oriented class. In one class of embodiments in particular, a multiplicity of such classes are organized according to a design pattern known as a 'chain of responsibility,' so that each object in the chain is instantiated with a reference to the next object in the chain and also with a reference to some managing object such as the indexing engine itself. The each heuristic may be implemented in a member method having a conventional name such as, for example, "void public runHeuristic(Document someDocument)." Such a class may be implemented, for example, as illustrated in the following pseudocode segment:

```
Class Heuristic {
    private DocumentStructureTemplate docStructTemp;
    void public setDocumentStructureTemplate(aTemplate) {
        docStructTemp = aTemplate; }
    private DocumentStructureTemplate defaultStructTemp;
    void public setDefaultTemplate(aTemplate){
        defaultStructTemp = aTemplate; }
    int comparisonThreshold;
    void public setComparisonThreshold(int threshold) {
        comparisonThreshold = threshold; }
    Heuristic nextHeuristic;
    void public setNextHeuristic(aHeuristic) {
        nextHeuristic = aHeuristic; }
    IndexingEngine myIndexingEngine;
    void public setMyIndexingEngine (anIndexingEngine){
        myIndexingEngine = anIndexingEngine; }
    void public runHeuristic(Document aDocument) {
        if(nextHeuristic == null) {// last link in chain indexin-
            gEngine.setSemantics(defaultStructTemp);
            return;
        }
        DocumentStructure aDocStruct = extractDocument-
            Structure(aDocument);
        int score = compare(aDocStruct, docStructTemp.Mod-
            elDocumentStructure);
        if(score > ComparisonThreshold)
            indexingEngine.setSemantics(docStructTemp);
        else nextHeuristic.runHeuristic(aDocument);
    }
}
```

This exemplary Heuristic class is said to the 'pseudocode' because it is presented in the form of source code, resembling Java or C++, as an example for explanation rather than an actual working model. This example includes a reference to a document structure template named 'docStructTemp.' DocStructTemp is structured in this example in a manner exemplified by the document structure templates of FIG. 4, including a model document structure and semantics for the model document structure. The example Heuristic class also has a reference to a default document structure template named 'defaultStructTemp.' The example Heuristic class includes an integer named 'comparisonThreshold' for storing a comparison threshold. The example Heuristic class includes a reference to a next heuristic object in a chain of responsibility, the reference in this case named 'nextHeuristic.' The example Heuristic class includes a reference, 'myIndexingEngine,' to the indexing engine that operates the heuristic. In this example, the indexing engine is assumed to be implemented as an object possessing a reference to the first heuristic object in a chain of responsibility, and each heuristic in the chain, when it is instantiated, is given a reference to the indexing engine for use in returning references to the indexing engine.

The member data is shown with accessor functions, setDocumentStructureTemplate( ), setDefaultTemplate( ), and so on, for use at instantiation time by a factory method or a management object. Alternatively, a Heuristic class may be fashioned with a constructor that sets its member data at instantiation time, reducing the need for accessor methods. Either way, by run time, an object of this example Heuristic class has references to a document structure template that its heuristic algorithm is designed for, a default document structure template, the next heuristic in its chain, its indexing engine, and integer storage for a comparison threshold.

In this example, the heuristic algorithm is implemented through the member method runHeuristic(Document) which receives a document, or a reference to a document, as a call parameter. RunHeuristic( ) begins operation by determining whether it is the last heuristic in a chain of responsibility with "if(nextHeuristic ==null)." If an object of the example Heuristic class finds that it is the last object in a chain, then, in this example, the runHeuristic( ) method proceeds by setting a default document structure template in the indexing engine with a call to:

indexingEngine.setSemantics(defaultStructTemp);

If the current heuristic object is not the last one in its chain, runHeuristic( ) proceeds in this example to identify the actual structure of the current document with a call to:

DocumentStructure aDocStruct = extractDocumentStructure(aDocument);

In this example, runHeuristic( ) implements its actual heuristic algorithm with a call to a compare( ) method that operates by scanning through a tree structure for the document and through a tree structure of a model document structure, comparing the two trees, incrementing an integer score for all points of positive comparison, and returning a score value to runHeuristic( ):

int score = compare(aDocStruct, docStructTemp.ModelDocumentStructure);

RunHeuristic( ) then compares the score with its comparison threshold, and if the score exceeds the threshold, runHeuristic( ) concludes that the semantics of its document structure template are good for the current document and sets a reference to its document structure template in the indexing engine with:

if(score > ComparisonThreshold) indexingEngine.setSemantics(docStructTemp);

If the score does not exceed the comparison threshold, in this example, runHeuristic( ) concludes that it cannot identify semantics for the document and passes the document to the next Heuristic object in its chain with:

else nextHeuristic.runHeuristic(aDocument);

This example heuristic establishes a match between a document structure and a model document structure good enough to identify semantics and support indexing, but this example heuristic, like many other heuristics, does not require an exact match between a document structure and a model document structure. Instead, this example heuristic determines a match between a document structure and a model document structure by use of a threshold that can be exceeded in cases where the match is very good or even perfect. Other heuristics utilize statistical pattern matching instead of scoring systems to identify a match between an actual document structure and a model document structure. Still other heuristics use rules bases in expert systems to identify matches between actual document structures and model document structures. Any heuristic for identifying semantics for a document structure, as will occur to those of skill in the art, is well within the scope of the present invention.

In the example of FIG. 3, the indexing engine 504 creates a semantics-based search index 500 by storing search keywords from documents 134 in index records according to the semantics from a selected document structure template 400. Some indexing engines treat every word in a document as a search keyword and index all of them. Other search engines exclude some articles and conjunctions that are viewed as being so common that they add little value to searches, articles and conjunctions such as, for example: a, an, the, and, or, but, and so on. Any way of selecting from a document search keywords for indexing, as will occur to those of skill in the art, is well within the scope of the present invention.

Storing search keywords from a document in records in a semantics-based search index according to the semantics from the selected document structure template in the example of FIG. 3 is carried out by assigning, to keywords from the document, semantics from the selected document structure template. Because the documents in this example are documents having express structure like HTML documents or XML documents, each search keyword has a structural location in a document. Assigning comprises associating semantics from a structural location in a model document structure to keywords from a corresponding structural location in an actual document.

Consider an example of a document having a document structure matching the model document structure in document structure template 402 on FIG. 4. In this example, assigning semantics to keywords from the document comprises assigning to keywords located in a frame in the document corresponding to frame 416 in the model document structure the semantic "Header." Similarly in this example, assigning semantics to keywords from the document comprises assigning to keywords located in a frame in the document corresponding to frame 418 in the model document structure the semantic "Footer."

For further explanation, consider an example of a document having a document structure matching the model document structure in document structure template 404 on FIG. 4.

In this example, assigning semantics to keywords from the document comprises assigning to keywords located in table data in the document corresponding to table data 420 in the model document structure the semantic "Navigation." Similarly in this example, assigning semantics to keywords from the document comprises assigning to keywords located in table data in the document corresponding to table data 422 in the model document structure the semantic "Content."

For further explanation, consider an example of a document having a document structure matching the model document structure in document structure template 406 on FIG. 4. In this example, assigning semantics to keywords from the document comprises assigning to keywords located in a table in the document corresponding to table 424 in the model document structure the semantic "Header."

Storing search keywords from a document in records in a semantics-based search index according to semantics from a selected document structure template in the example of FIG. 3 comprises storing with each search keyword assigned semantics according to the keyword's structural location in the document. Storing semantics along with the keywords creates a semantics-based search index as illustrated in FIG. 5. FIG. 5 shows an exemplary data structure, a table comprising a semantics-based search index that includes keywords 552-568, semantics for the structural location where the keyword was found in a document, and a URL 578 identifying the cyberspace location of the document where the keyword was found.

In the example of FIG. 5, a query, in URI encoded data, of:
    query=IBM+Java&scope=content would retrieve index records 556, 558, and 568 because each of these records contains one of the keywords 'IBM' or 'Java' and each has semantics of 'Content.' The fact that each has semantics of 'Content' means that each was retrieved for indexing from a structural location having semantics of 'Content.'

The fact that each keyword of a query was retrieved for indexing from a structural location having semantics of 'Content,' however, does not indicate which partition of structure each keyword was in. Consider the following segment of XML, for example:

<HTML>
      <HEAD><TITLE>EJB Article<TITLE></HEAD>
      <BODY>
        <TABLE>
          <TR colspan='2'/ part ID='1' '/>
            <TD> text containing keywords </TD>
          </TR>
          <TR/ part ID='2' />
            <TD> text containing keywords </TD>
          </TR>
          <TR / part ID='3' />
            <TD> text containing keywords </TD>
          </TR / part ID='4' />
          <TR colspan='2'>
            <TD> text containing keywords </TD>
          </TR>
        </TABLE>
      </BODY>
    </HTML>

The 'part ID' attributes are pseudocode additions in aid of explanation, so that reference can be made to partition 1, partition 2, and so on. Documents in some other markup languages, languages in which users, programmers, or developers are able to define the markup elements, such as, for example, XML or SGML, can include whatever indications of partition identification are needed or desired. In addition, it is useful to note that the markup for partition identification is not necessarily incorporated into the document as such, but may be used only temporarily for indexing purposes.

Consider an example in which an indexing engine treats each segment of table data <TD></TD> as a partition of document structure and assigns semantics to the structure so that partition 1 has the semantics 'Header,' partition 2 has the semantics 'Content,' partition 3 has the semantics 'Content,' and partition 2 has the semantics 'Footer.' If no further information is provided, there is no way of knowing, that is, no way for a search engine to distinguish, whether keywords indexed with semantics 'Content' came from partition 2 or partition 3.

Consider the example query mentioned above, represented as URI encoded data:

query=IBM+Java&scope=content

If the keyword 'IBM' were found in partition 2 of the exemplary HTML document above, and the keyword 'Java' were found in partition 3, the query would retrieve semantics-based search index records identifying that document, even if the two partitions are in fact about two very different subjects. It would be advantageous to be able to scope a search to the same partition, so that the example query would only retrieve index records for keywords occurring in the same partition, thereby increasing the chances that the partition in question is actually discussing the subject a user is searching for.

A more precise result can be obtained by indexing also an identification of which keywords came from the same structural partition of the documents from which the keywords were extracted for indexing. Indexing engines according to embodiments of the present invention, in creating semantics-based search indexes, typically do store with each search keyword an identification of the keyword's structural location in a document. In the exemplary semantics-based search index 500 of FIG. 5, identifications of keywords' structural locations in documents are exemplified by the partition identification field 'Part ID' 574, which is implemented in the example as an integer identification of structural partitions.

The keywords 'IBM' in record 556, 'Web' in record 560, and 'Portal' in record 562 all came from the same partition having semantics 'Content.' More particularly, in this example query:

query=IBM+Java&scope=content, the keywords 'IBM' in record 558 and 'Java' in record 566 both came from the same partition having semantics 'Content,' so this page would be considered the best match. That is, a better match than a page with 'IBM' and 'Java' in different partitions having semantics 'Content,' and still far better than current search engine results, which return pages with the terms 'IBM' and 'Java' anywhere in the page. Using a partition identification field would, in the current example, achieve a more precise result by retrieving only the two records 558 and 566 because each of these records contains one of the keywords 'IBM' or 'Java,' each has semantics of 'Content,' and each occurred in the same partition of document structure.

Indexing engines according to embodiments of the present invention, such as, for example, the indexing engine 504 of FIG. 3, also typically and advantageously assign relevance to records in semantics-based search indexes in dependence upon semantics. Search engines, such as for example, the exemplary search engine 505 of FIG. 3, typically use measures of relevance for ordering search results in search results messages 522 in response to search query messages 520 from clients 518. The exemplary semantics-based search index records of FIG. 5 show relevance 576 as part of their data. One exemplary measure of relevance is a count of how many times a keyword occurs in a partition of document structure. Another example of a measure of relevance is where a keyword occurs in a partition of document structure, giving more weight to keywords occurring earlier in a partition, closer to the top or beginning of a partition rather than lower down in the partition. Other measures of relevance will occur to those of skill in the art, and assigning relevance on the basis of any such measure is well within the scope of the present invention.

Figure 6:
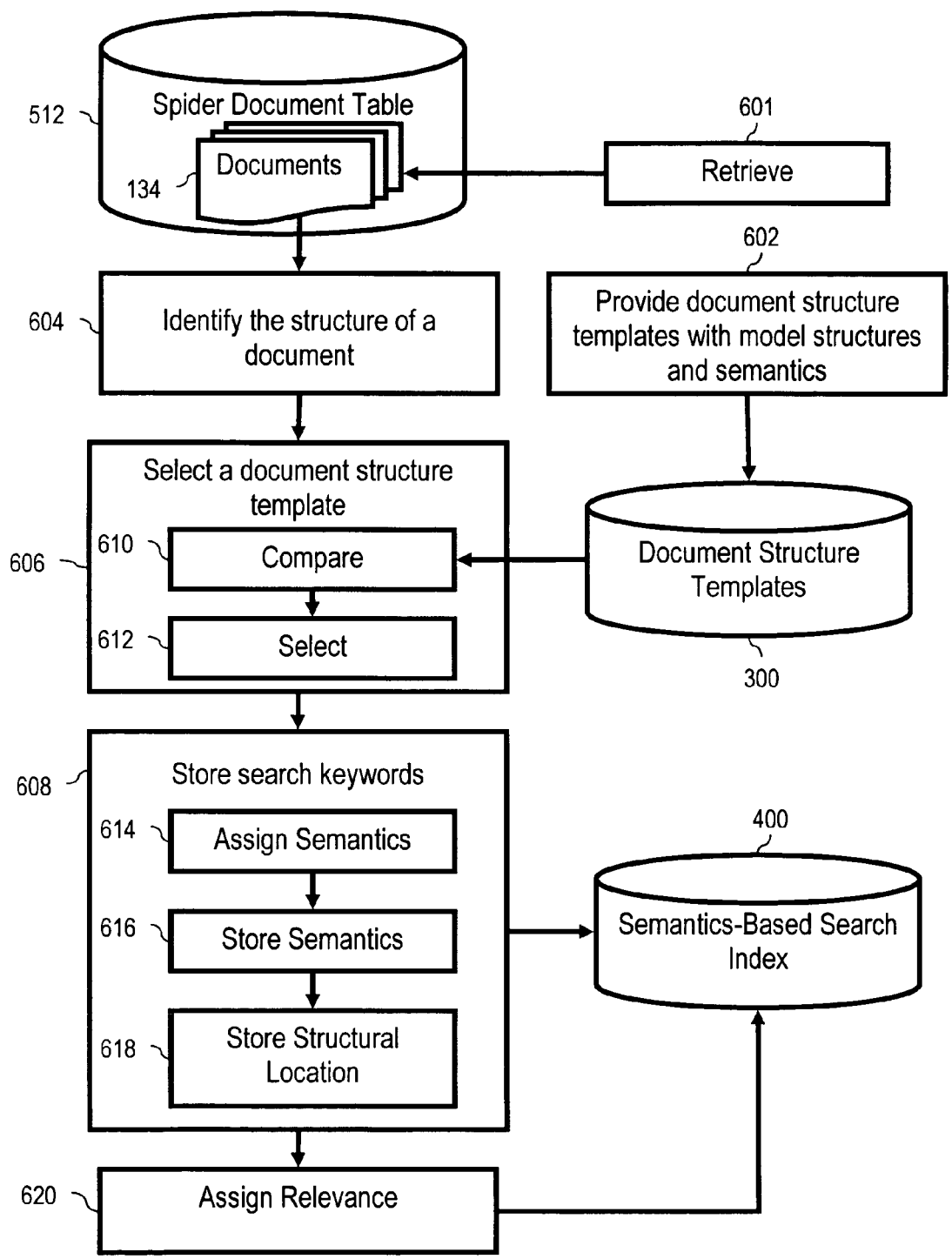
FIG. 6 sets forth a flow chart illustrating an exemplary method for indexing information in a distributed data processing system.

An exemplary method for indexing information in a distributed data processing system is now described with reference to FIG. 6. FIG. 6 sets forth a flow chart illustrating an exemplary method for indexing information in a distributed data processing system. The exemplary method of FIG. 6 begins with retrieving 601 documents from a multiplicity of computers coupled for data communications in the distributed data processing system. Retrieving documents is carried out by a spider crawling a distributed data processing system, visiting network locations identified from tables, or crawling from site to site, document to document, through hyperlinks set forth in the documents themselves. Such a spider retrieves documents 134 and places them for storage in a document table or database such as the one illustrated at reference 512 in FIG. 6.

The method of FIG. 6 includes providing 602 document structure templates comprising model document structures and semantics for the model document structures. Providing document structure templates may be carried out, for example, by a user's or a programmer's typing them into a database record through a computer terminal with a keyboard and a GUI under control of a data entry program set up for that purpose.

The method of FIG. 6 also includes identifying 604 the structure of a document. Identifying the structure of a document may be carried out, for example, by parsing a document having contents and structure into a document data structure representing the structure of the document. In many indexing systems according to embodiments of the present invention, a document data structure representing the structure of a document is a tree structure. As an advantage for ease of comparison, it is common in various embodiments of the present invention to implement model document structures in document structure templates 300 as tree structures.

The method of FIG. 6 also includes selecting 606 a document structure template in dependence upon the structure of the document and the model document structures in the document structure templates. Selecting 606 a document structure template in dependence upon the structure of the document and the model document structures in the document structure templates may be carried out, for example, by comparing 610 the structure of the document and the model document structures in the templates and selecting 612 a template whose model document structure matches the structure of the document.

The method of FIG. 6 also includes storing 608 search keywords from the document in records in a semantics-based search index according to the semantics from the selected document structure template. Storing 608 search keywords from the document according to the semantics from the selected document structure template may be carried out, for example, by assigning 614, to keywords from the document, semantics from the selected document structure template and storing 616 with each search keyword semantics for the keyword's structural location in the document. Storing 608 search keywords from the document in records in a semantics-based search index according to the semantics from the selected document structure template also may advantageously include storing 618 with each search keyword an identification of the keyword's structural location in the document. In addition, methods for indexing information in a distributed data processing system, as exemplified in the method of FIG. 6, also may advantageously include assigning 620 relevance to the records in a semantics-based search index in dependence upon the semantics.

Semantics-Based Searches in Distributed Data Processing

Figure 7:
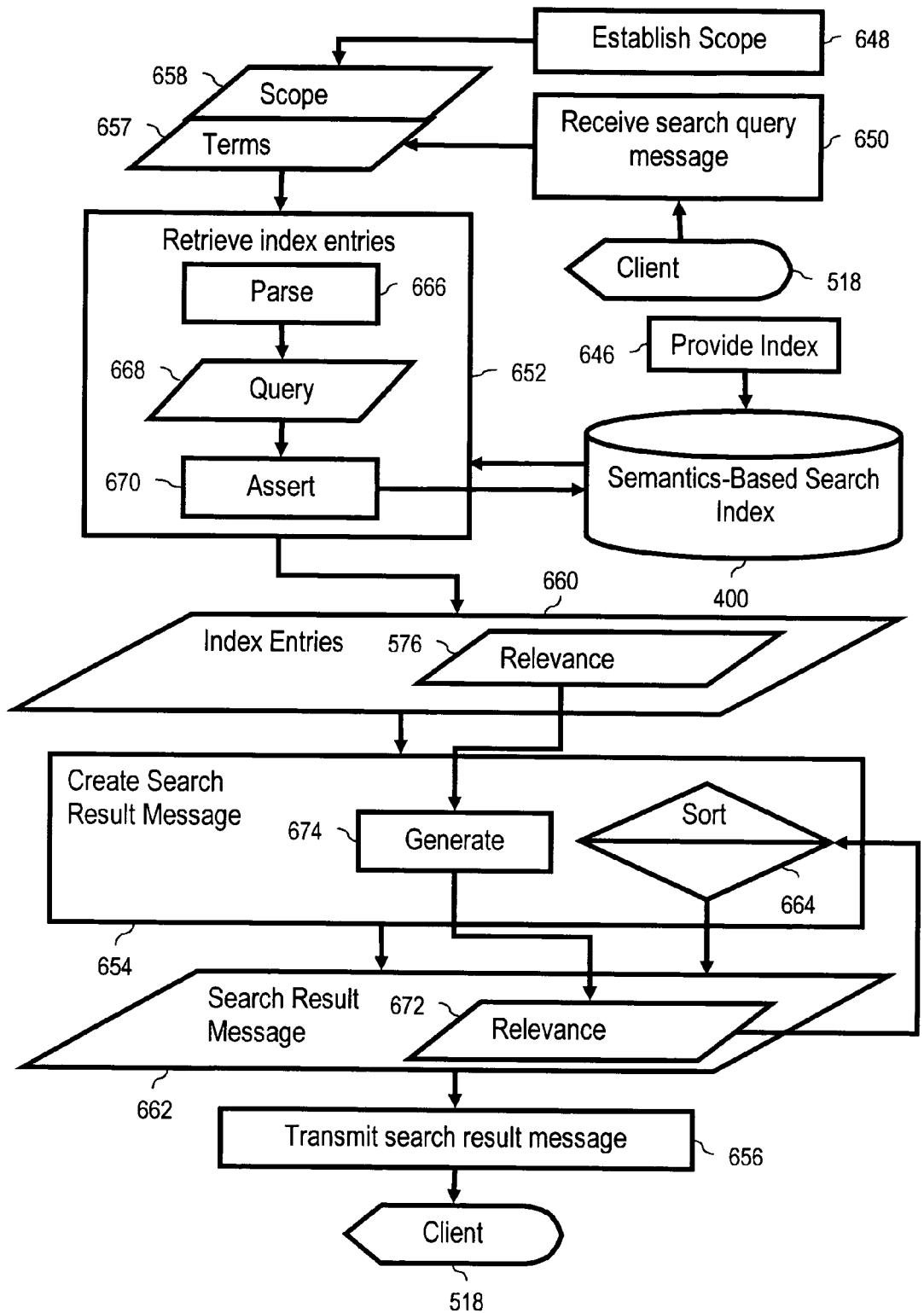
FIG. 7 sets forth a flow chart illustrating an exemplary method for searching for information in a distributed data processing system.

FIG. 7 sets forth a flow chart illustrating an exemplary method for searching for information in a distributed data processing system. The method of FIG. 7 includes providing 646 a semantics-based search index 400 by storing in the semantics-bases search index search keywords from documents according to semantics from selected document structure templates, where the document structure templates selected in dependence upon the structures of the documents and upon model document structures in the document structure templates, all as described in detail above in this specification.

The method of FIG. 7 also includes establishing 648 a search scope 658 corresponding to semantics supported by the semantics-based search index 400, and receiving 650 from a client 518 a search query message comprising search terms 657 and, optionally, the search scope 658. Search scopes are human-readable descriptions of search queries that parse to corresponding encodings of semantics as the semantics are actually coded in any particular semantics-based search index. Consider for further explanation the following table illustrating a correspondence between search scope and semantics:

| Scope | Semantics |
|---|---|
| Title | title |
| Header | header |
| Left Navigation Bar | leftNav |
| Right Navigation Bar | rightNav |
| Content | content |
| Page | document |
| Navigation | leftNav+rightNav |

In this example of correspondence between search scope and semantics, the search scope "Left Navigation Bar" corresponds to semantics "leftNav." The search scope "Right Navigation Bar" corresponds to semantics "rightNav." The search scope "Page" corresponds to semantics "document," which may be parsed as "title+header+leftNav+rightNav," which in this example is again the entire document.

Search scopes may explicitly include more than one scope term. In this example, the search scope "Navigation" corresponds to semantics "leftNav+rightNav," so that the URI encoded query:

query=mine+geology&scope=navigation, based upon the correspondence set forth in this example table, may be parsed as:

'mine', 'geology', 'leftNav', 'rightNav'

Readers of skill will note that the search scope "Title" and the semantics "title" as well as the search scope "Header" and the semantics "header" in this example are words that are also used as element names in some markup languages, such as, for example, <header> or <title>. It is useful to note that search scopes are mnemonics that correspond to semantics and that semantics are encodings of the meaning or use of document structure rather than the structure itself. The fact that an identified partition of a document is assigned the semantics "header," does not mean generally that there is in the document itself a markup element named "header." The document may or may not contain a <header> element, and, if there is a <header> element, it may or may not be assigned the semantics "header," depending on the operation of the heuristic that successfully matches the document structure. This specification describes a correspondence between search scopes and semantics in semantics-based search indexes. This specification does not describe a general correspondence between search scope or semantics and element names in markup languages.

Receiving 650 from a client 518 a search query message comprising search terms 657 and, optionally, the search scope 658 typically comprises receiving a request message in a hyperlinking protocol such as HTTP, WAP, HDTP, and the like. In such messages, the search terms and optionally the search scope typically are included as form data or URI encoded data. A search query for geology as used in mining, for example, may be URI encoded as:

query=mine+geology

A search query for geology as used in mining, for example, may be URI encoded with a search scope as:

query=mine+geology&scope=content

The inclusion of the search scope in the search query message is said to be optional because the search scope can be set either in a client or in a server. If the search scope is set on the client side, then search query messages can include search scopes. If the search scope is set on the server side, then the search query message may not include the search scope and the search scope, or its corresponding semantics, can be parsed into a query on the server side.

Figure 8:
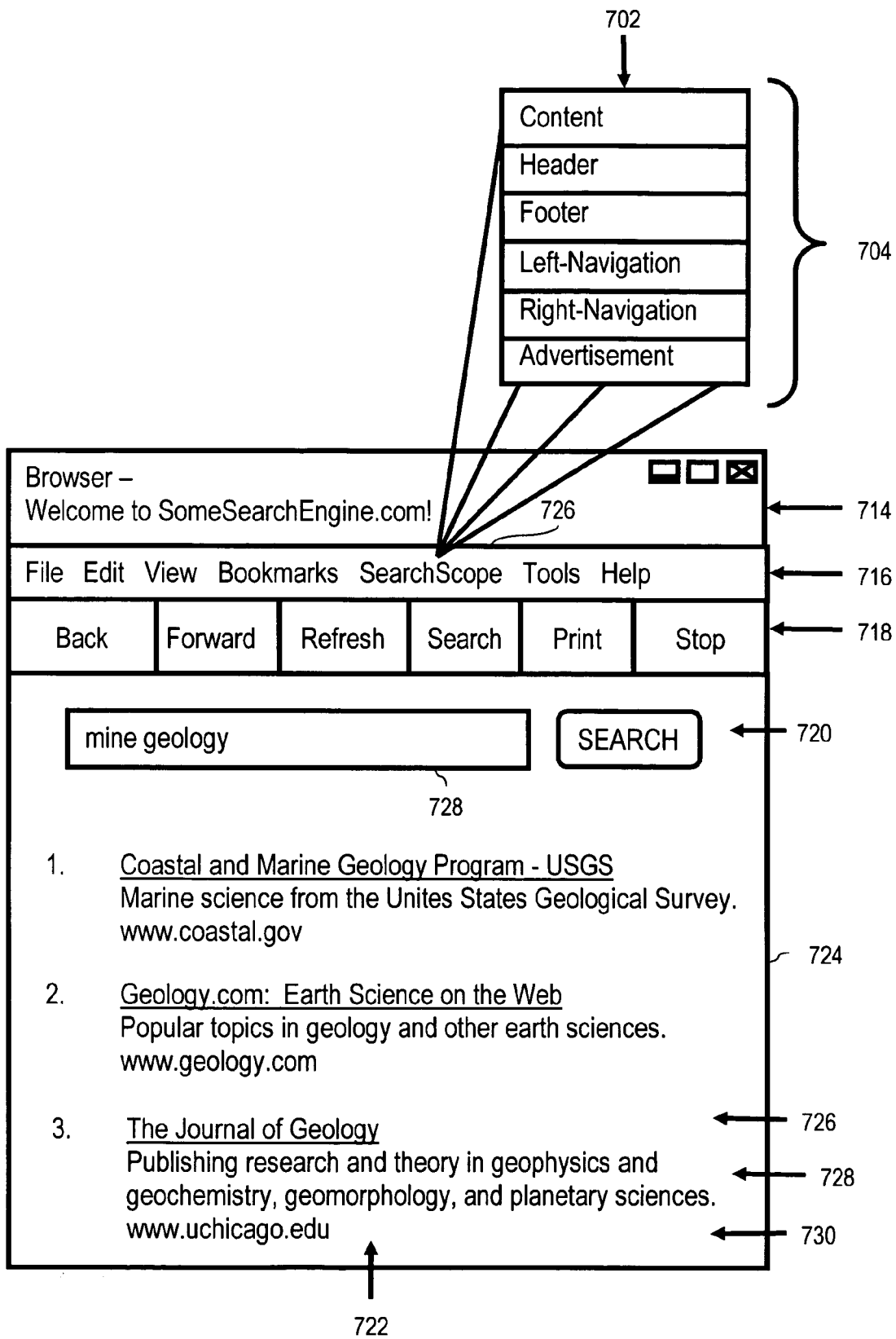
FIG. 8 depicts an exemplary GUI on a client running a data communication application.

FIG. 8 depicts an exemplary GUI on a client running a data communication application, more particularly, in the example of FIG. 8, a browser 724. The browser of FIG. 8 is an example where establishing a search scope comprises setting a search scope in a client so that search query messages may include the search scope. Setting a search scope in a browser can be carried out by use of an HTML page comprising forms that prompt for scope and accept scope entries as form data which is then included in search query messages to web servers, message-by-message. Alternatively, a browser can use a plug-in, or the browser can be programmed from the beginning to prompt for and store search scopes as operating parameters or user preferences, so that the search scopes persist across search sessions.

The example browser of FIG. 8 is one that has been programmed, or modified with a plug-in, to accept and retain user selections of search scope. The browser of FIG. 8, as depicted, has been operated to point to a web site named "SomeSearchEngine.com," as shown in the title bar of the browser display 714. The browser of FIG. 8 includes a GUI toolbar 718 with a Back button, a Forward button, and buttons for refreshing the display, searching, printing, and stopping web page retrievals. The browser of FIG. 8 also includes a GUI horizontal menu 716 containing the entries File, Edit, View, Bookmark (sometimes called 'Favorites'), SearchScope, Tools, and Help. The menu entry called SearchScope 726 is programmed to display a menu 702 of search scopes 704 and store in computer memory a users choice of search scope 704 from the menu 702. The browser is programmed then to use the search scope so chosen and stored in search query messages until a user changes it by again selecting another search scope through use of the SearchScope 716 item and its menu 702.

The browser of FIG. 8 also displays three entries 722 from a search result message generated in response to the query, "mine geology," displayed in a query entry field 732. Each entry in the search results includes a title 726 for the document described by the entry, one or two lines of descriptive text 728, and a URI identifying the document described by the entry.

In addition to setting search scopes in clients, establishing 648 a search scope 658 can also be carried out by setting a search scope in a server. When search scopes are set in a server, search scopes need not be included in search query messages because the search scope is available on the server side. Search scopes may advantageously be set server side in web servers operated as 'portals' on which users can register user accounts, log on, and enter user account parameters, including search scopes, that persist across searches and even across logon sessions.

The method of FIG. 7 also includes retrieving 652, from the semantics-based search index 400, index entries 660 satisfying the search terms and the search scope. In the example of FIG. 7, retrieving 652 index entries 660 satisfying the search terms 657 and the search scope 658 is carried out by parsing 666, in dependence upon the correspondence between the search scope and the semantics, the search terms and search scope into a search query 668. In the example of FIG. 7, retrieving 652 index entries 660 satisfying search terms and the search scope 658 also comprises asserting 670 a search query 668 against the semantics-based search index 400.

Parsing 666 search terms and search scope into a search query 668 can be carried out by concatenating or inserting search keywords from a query message and semantics mapped from corresponding search scope terms into a SQL query. Beginning with the following search terms and search scope from a search query message, for example, query=mine+geology&scope=content a search engine according to embodiments of the present invention parses them in stages, first putting the search keywords into the form of a string that is useful in an IN clause in a SQL query:

'mine','geology' into then into a SQL query as such:
SELECT ALL FROM semanticIndex
WHERE keyword IN ('mine', 'geology')
INTO tempTable;

This SQL query retrieves from a semantic-based search index named 'semanticIndex' records having keywords 'mine' or 'geology.' In this example, the semantic-based search index 'semanticIndex' is exemplified by the table shown in FIG. 9, having columns for keywords 570, semantics, 572, indications of structural locations in documents called 'partition identifications' or 'part ID' 574, relevance of records in the search index 576, and URLs identifying the documents from which the keywords were indexed.

Asserting this example SQL query against the index of FIG. 9 extracts the records shown in FIG. 10, which still contain disparate semantics and partition identifications. In this example, therefore, parsing 666 search terms and search scope into a search query 668 advantageously also includes parsing the search scope or the semantics corresponding to the search scope 'content' into a where clause in a SQL query:

SELECT ALL FROM tempTable A, tempTable B
WHERE A.semantic = 'content' AND A.partID = B.partID
INTO tempTable2;

This is an example of a SQL query that uses a so-called self-join with aliasing. In this example SQL query, the table in FIG. 10 is taken as 'tempTable,' and tempTable is aliased as A and as B. This example SQL query extracts from tempTable records having semantics set to 'content' and having matching structure location for their keywords. Asserting this example SQL query against the table of FIG. 10, extracts the records shown in FIG. 11. In this example SQL query, the records shown in FIG. 11 are referred to as 'tempTable2.'

The method of FIG. 7 also includes creating 654 from the retrieved index entries 660 a search result message 662. In the example of FIG. 7, creating 654 a search result message 662 is carried out by generating 674, in dependence upon assigned indications of relevance for the index entries 576, measures of relevance 672 for entries in the search result message 662. The records in FIG. 11, which were extracted from the semantics-based search index illustrated in FIG. 9, include assigned indications of relevance for index entries 576, that is, for entries in a semantics-based search index. Generating 674, in dependence upon assigned indications of relevance for the index entries 576, measures of relevance 672 for entries in the search result message 662 can be carried out, for example, by summing the assigned indications of relevance for index entries 576 across a partition identification or structural location of a keyword. More particularly, summing the assigned indications of relevance for index entries 576 across a partition identification can be carried out by use of a GROUP BY clause in conjunction with a SQL 'sum' keyword in a SQL query:

SELECT title, description, URL, sum(relevance) as resultsRelevance
FROM tempTable2
GROUP BY part ID This example SQL query extracts from the records shown in table 11 one record for each partition identification, adds a column named 'resultsRelevance,' and stores in the new column the sum of the assigned indications of relevance for index entries 576 for each partition identification in the table of FIG. 11. The 'relevance' in 'sum(relevance)' is a reference to the index relevance measure in column 576 in FIG. 11. The 'title' and 'description' fields are not shown in FIG. 11, but are assumed to be present for purposes of this example.

Asserting this example SQL query against the table of FIG. 11, extracts the records shown in FIG. 12 that includes a title 970, a description 972, a URL 578, and a relevance 974. In FIG. 12, the column labeled 'relevance' 974 is now a measure of relevance 672 for entries in a search result message 662, according to the exemplary method of FIG. 7. In this example, the measure of relevance 974 for entries in a search result message were created by summing measures of relevance for index records for each URL in the table of FIG. 11.

In the method of FIG. 7, creating 654 a search result message 662 also includes sorting 664 search result message entries according to measures of relevance 672 for entries in the search result message 662. Sorting 664 search result message entries according to measures of relevance 672 can be carried out, for example, by use of an ORDER BY cause in a SQL query as illustrated in the following example:

SELECT title, description, URL, sum(relevance) as resultsRelevance
FROM tempTable2
GROUP BY part ID
ORDER BY resultsRelevance DESC This example SQL query extracts from the records shown in table 11 one record for each partition identification, adds a column named 'resultsRelevance,' stores in the new column the sum of the assigned indications of relevance for index entries 576 for each partition identification in the table of FIG. 11, and sorts the extracted records in descending order according to resultsRelevance, which as mentioned above, is a measure of relevance for entries in a search result message.

For purposes of clarity of explanation, the process of parsing search terms and search scope into a search query has been shown in stages with reference to FIGS. 9-12. As a practical matter, however, search terms and search scope may be parsed directly into a single SQL query. The following URI encoded search terms and search scope, for example:

query=mine+geology&scope=content may be parsed directly into the following exemplary SQL query:

SELECT title, description, URL, sum(relevance) as resultsRelevance
FROM (SELECT ALL FROM semanticIndex A, semanticIndex A
WHERE keyword IN ('mine','geology')
AND A.semantic = 'content'
AND A.partID = B.partID)
GROUP BY partID
ORDER BY resultsRelevance DESC This SQL query, when asserted against a search index like the one illustrated in FIG. 9, directly produces the result shown in FIG. 12, carrying out all the intermediate steps described above, extracting records with keywords 'mine' or 'geology,' extracting records with semantics of 'content' with keywords from the same structural location with in the document identified by a URL, calculating measures of relevance for entries in a search result message, sorting the results in descending order according to relevance, and so on.

The method of FIG. 7 also includes transmitting 656 a search result message 662 to a client 518. Transmitting 656 a search result message 662 to a client 518 is typically carried out by transmitting a response message in a hyperlinking protocol such as HTTP, WAP, HDTP, and the like. Such a response message typically includes the search results expressed in a markup language, such as, for example, HTML or WML, for display on a browser. The GUI in FIG. 8, for example, shows the search results from FIG. 12 displayed on a browser screen sorted in descending order according to search result relevance.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for searching for information in a distributed data processing system, the method comprising:
providing a semantics-based search index by storing in the semantics-bases search index search keywords from documents according to semantics from selected document structure templates, the document structure templates selected in dependence upon the structures of the documents and upon model document structures in the document structure templates;
establishing a search scope corresponding to semantics supported by the semantics-based search index;
receiving from a client a search query message comprising search terms and, optionally, the search scope;
retrieving, from the semantics-based search index, index entries satisfying the search terms and the search scope;
creating from the retrieved index entries a search result message; and
transmitting the search result message to the client.

2. The method of claim 1 wherein establishing a search scope comprises setting a search scope in the client, and the search query message further comprises the search scope.

3. The method of claim 1 wherein establishing a search scope comprises setting a search scope in a server.

4. The method of claim 1 wherein retrieving, from the semantics-based search index, index entries satisfying the search terms and the search scope comprises parsing, in dependence upon the correspondence between the search scope and the semantics, the search terms and search scope into a search query.

5. The method of claim 1 wherein retrieving, from the semantics-based search index, index entries satisfying the search terms and the search scope comprises asserting a search query against the semantics-based search index.

6. The method of claim 1 wherein creating the search result message comprises generating, in dependence upon assigned indications of relevance for the index entries, measures of relevance for entries in the search result message.

7. The method of claim 1 wherein creating the search result message comprises sorting search result message entries according to measures of relevance for entries in the search result message.

8. The method of claim 1 wherein the distributed data processing system comprises a multiplicity of computers coupled for data communications, wherein the computers coupled for data communications further comprise clients and servers.

9. The method of claim 1 wherein the distributed data processing system comprises a multiplicity of computers, including clients and servers, coupled for data communications through hyperlinking protocols.

10. The method of claim 1 wherein the distributed data processing system comprises a multiplicity of computers, including clients and servers, coupled for data communications through hyperlinking protocols, and receiving a search query message comprises receiving, in a server comprising a search engine and supporting a hyperlinking protocol, from a client, a search query message in the supported hyperlinking protocol.

11. A system for searching for information in a distributed data processing system, the system comprising:
a processor;
means for providing a semantics-based search index by storing in the semantics-bases search index search keywords from documents according to semantics from selected document structure templates, the document structure templates selected in dependence upon the structures of the documents and upon model document structures in the document structure templates;
means for establishing a search scope corresponding to semantics supported by the semantics-based search index;
means for receiving from a client a search query message comprising search terms and, optionally, the search scope;
means for retrieving, from the semantics-based search index, index entries satisfying the search terms and the search scope;
means for creating from the retrieved index entries a search result message; and
means for transmitting the search result message to the client.

12. The system of claim 11 wherein means for establishing a search scope comprises means for setting a search scope in the client, and the search query message further comprises the search scope.

13. The system of claim 11 wherein means for establishing a search scope comprises means for setting a search scope in a server.

14. The system of claim 11 wherein means for retrieving, from the semantics-based search index, index entries satisfying the search terms and the search scope comprises means for parsing, in dependence upon the correspondence between the search scope and the semantics, the search terms and search scope into a search query.

15. The system of claim 11 wherein means for retrieving, from the semantics-based search index, index entries satisfying the search terms and the search scope comprises means for asserting a search query against the semantics-based search index.

16. The system of claim 11 wherein means for creating the search result message comprises means for generating, in dependence upon assigned indications of relevance for the index entries, measures of relevance for entries in the search result message.

17. The system of claim 11 wherein means for creating the search result message comprises means for sorting search result message entries according to measures of relevance for entries in the search result message.

18. The system of claim 11 wherein the distributed data processing system comprises a multiplicity of computers coupled for data communications, wherein the computers coupled for data communications further comprise clients and servers.

19. The system of claim 11 wherein the distributed data processing system comprises a multiplicity of computers, including clients and servers, coupled for data communications through hyperlinking protocols.

20. The system of claim 11 wherein the distributed data processing system comprises a multiplicity of computers, including clients and servers, coupled for data communications through hyperlinking protocols, and means for receiving a search query message comprises means for receiving, in a server comprising a search engine and supporting a hyperlinking protocol, from a client, a search query message in the supported hyperlinking protocol.

21. A computer program product for searching for information in a distributed data processing system, the computer program comprising:

a recording medium;

means, recorded on the recording medium, for providing a semantics-based search index by storing in the semantics-bases search index search keywords from documents according to semantics from selected document structure templates, the document structure templates selected in dependence upon the structures of the documents and upon model document structures in the document structure templates;

means, recorded on the recording medium, for establishing a search scope corresponding to semantics supported by the semantics-based search index;

means, recorded on the recording medium, for receiving from a client a search query message comprising search terms and, optionally, the search scope;

means, recorded on the recording medium, for retrieving, from the semantics-based search index, index entries satisfying the search terms and the search scope;

means, recorded on the recording medium, for creating from the retrieved index entries a search result message; and means, recorded on the recording medium, for transmitting the search result message to the client.

22. The computer program product of claim 21 wherein means for establishing a search scope comprises means, recorded on the recording medium, for setting a search scope in the client, and the search query message further comprises the search scope.

23. The computer program product of claim 21 wherein means for establishing a search scope comprises means, recorded on the recording medium, for setting a search scope in a server.

24. The computer program product of claim 21 wherein means for retrieving, from the semantics-based search index, index entries satisfying the search terms and the search scope comprises means, recorded on the recording medium, for parsing, in dependence upon the correspondence between the search scope and the semantics, the search terms and search scope into a search query.

25. The computer program product of claim 21 wherein means for retrieving, from the semantics-based search index, index entries satisfying the search terms and the search scope comprises means, recorded on the recording medium, for asserting a search query against the semantics-based search index.

26. The computer program product of claim 21 wherein means for creating the search result message comprises means, recorded on the recording medium, for generating, in dependence upon assigned indications of relevance for the index entries, measures of relevance for entries in the search result message.

27. The computer program product of claim 21 wherein means for creating the search result message comprises means, recorded on the recording medium, for sorting search result message entries according to measures of relevance for entries in the search result message.

28. The computer program product of claim 21 wherein the distributed data processing system comprises a multiplicity of computers coupled for data communications, wherein the computers coupled for data communications further comprise clients and servers.

29. The computer program product of claim 21 wherein the distributed data processing system comprises a multiplicity of computers, including clients and servers, coupled for data communications through hyperlinking protocols.

30. The computer program product of claim 21 wherein the distributed data processing system comprises a multiplicity of computers, including clients and servers, coupled for data communications through hyperlinking protocols, and means for receiving a search query message comprises means, recorded on the recording medium, for receiving, in a server comprising a search engine and supporting a hyperlinking protocol, from a client, a search query message in the supported hyperlinking protocol.

* * * * *